United States Patent [19]
Maul et al.

[11] 4,376,229
[45] Mar. 8, 1983

[54] SHIELDED CONDUIT

[75] Inventors: Frederick E. Maul, Milpitas; Edward P. Goett, Geyserville, both of Calif.

[73] Assignee: Raychem Corporation, Menlo Park, Calif.

[21] Appl. No.: 187,663

[22] Filed: Sep. 16, 1980

[51] Int. Cl.³ .......................... H05K 9/00; H01B 7/34
[52] U.S. Cl. ................................ 174/35 R; 138/121;
138/126; 138/127; 174/36; 174/102 D;
174/107; 174/109
[58] Field of Search ................... 174/35 R, 36, 87, 88,
174/89, 107, 109, 102 R, 102 D; 138/121, 122,
123, 124, 126, 127, 145; 156/86, 143

[56] References Cited

U.S. PATENT DOCUMENTS

| | | | |
|---|---|---|---|
| 2,125,447 | 8/1938 | Jacobson | 138/123 X |
| 2,514,905 | 7/1950 | Solero | 138/124 X |
| 3,047,026 | 7/1962 | Kahn | 138/122 |
| 3,329,764 | 7/1967 | Tanges, Jr. | 174/36 X |
| 3,466,210 | 9/1969 | Wareham | 174/138 R X |
| 3,651,244 | 3/1972 | Silver et al. | 174/36 |
| 3,725,167 | 4/1973 | Love et al. | 156/143 |
| 3,749,812 | 7/1973 | Reynolds et al. | 174/36 X |
| 4,032,708 | 6/1977 | Medney | 174/36 X |
| 4,150,249 | 4/1979 | Pedersen | 174/36 |
| 4,190,088 | 2/1980 | Lalikos et al. | 138/126 |

FOREIGN PATENT DOCUMENTS

| | | |
|---|---|---|
| 1088295 | 9/1960 | Fed. Rep. of Germany . |
| 765506 | 6/1934 | France . |
| 1034413 | 7/1953 | France . |
| 61785 | 5/1955 | France . |
| 148843 | 3/1973 | France . |
| 995480 | 10/1963 | United Kingdom . |
| 1486445 | 9/1977 | United Kingdom . |

*Primary Examiner*—Volodymyr Y. Mayewsky
*Attorney, Agent, or Firm*—Douglas A. Chaikin

[57] ABSTRACT

Flexible electrical shielding conduit and method for making same wherein the conduit comprises multiple layers including a flexible conduit tubing outer layer, an electrical shielding layer disposed within the tubing and in contact with the conduit layer, and a woven retaining layer inside the shielding layer, said woven retaining layer expanding radially outwardly when compressed axially continuously forcing the shielding layer into contact with the conduit tubing to provide an unobstructed passageway therethrough. An alternative embodiment and the method for making same wherein the electrical shielding layer and the retaining layer are combined to form an integral inner layer having the properties as described above.

16 Claims, 6 Drawing Figures

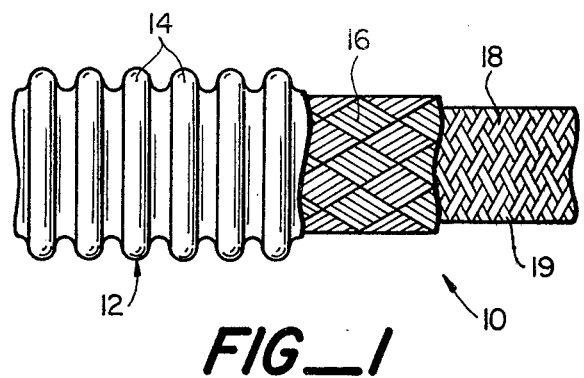
FIG_1
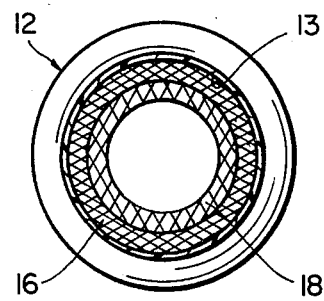
FIG_2
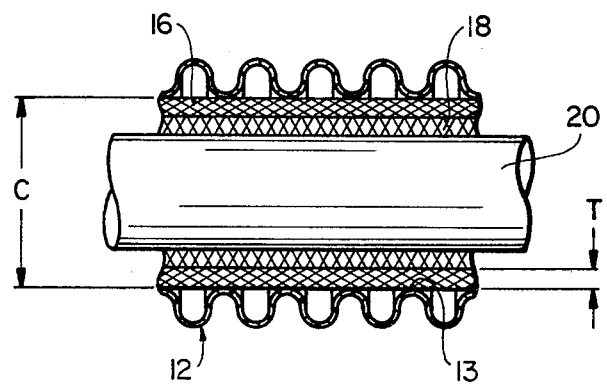
FIG_3
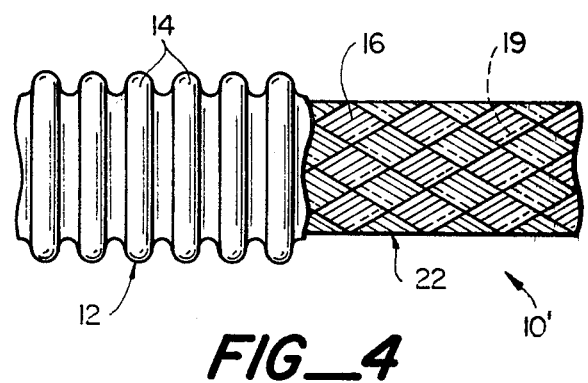
FIG_4

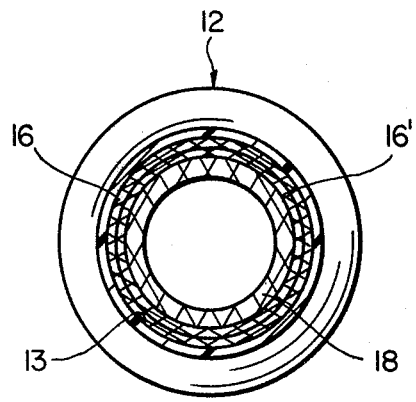
FIG_5
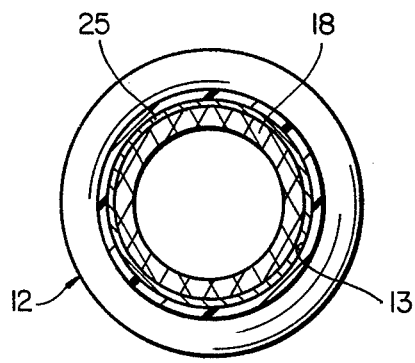
FIG_6

SHIELDED CONDUIT

BACKGROUND OF THE INVENTION

For many years there has been a long felt need in the industry to have a lightweight, highly flexible and crush resistant electrically shielded conduit. In response to that need various solutions have been attempted. For example, U.S. Pat. No. 3,466,210 to Wareham in 1966 discloses a method of heat shrinking fibrous material (including electrical shielding material) around the outside of a tubular member or conduit. Others have also attempted to solve the long felt need by similarly wrapping electrically shielded braid over one conduit and sandwiching it with another layer of larger size conduit. For example, one product presently on the market, manufactured by Icore of Sunnyvale, California, comprises a first spiraled or convoluted conduit tubing wrapped with electrical shielding braid, and sandwiched by a second larger cross-section spirally convoluted conduit tubing which is force fit over the braid and first conduit. The Icore structure is quite heavy and loses some of its flexibility as a result of the two layers of conduit tubing.

Others have similarly wrapped the outside surface of the conduit tubing with overlapping layers of electrical shielding, e.g. Plumber, U.S. Pat. Nos. 3,467,761 and Silver, et al 3,651,244. The overlapping layers of electrical shielding causes the shielding layer to be an irregular layer resulting in possible undesirable hoop effects.

Likewise, Silver, et al supra, discloses a shielding tape wrapped over the outside of a conduit. It is presumed that such a conduit does not lose a great deal of its flexibility. However, when one one considers the hoop effects of such wrapped tape and the irregular shielding layer resulting therefrom, the disclosed structure may not be useful in a variety of situations.

Relatively recently, the art of inflexible type shielding conduits has significantly advanced; see for example, McLaughlin, U.S. Pat. Nos. 3,946,143 and 4,016,356 assigned to Raychem Corporation, the assignee herein, which discloses methods for making shielding cable using heat shrinkable technology. It will be noticed that in essence one conduit is again wrapped around the outside of another larger diameter conduit sandwiching the electrical braid between the two conduits.

Applicant has discovered a lightweight, highly flexible, internally and uniformly electrically shielded conduit not disclosed or taught by any of the above mentioned discoveries. The applicant's structure includes an outer flexible tubing layer and internal shielding layer being continuously and continually held against the tubing layer by an internal woven retaining means.

OBJECTS OF THE INVENTION

A primary object of the invention is to provide flexible electrical shielding conduit having a continuously unobstructed passageway which remains open even upon severe bending of tubing.

Another object of the invention is to provide a lightweight electrical shielding conduit having internal shielding means held in place by a retaining means continuously forcing the shielding means against the conduit tubing.

A further object of this invention is to provide electrical conduit shielding having an outer conduit tubing layer and an internal layer of electrical shielding wherein the internal layer is continuously pressed against the inner walls of the conduit tubing via a retaining means.

SUMMARY OF THE INVENTION

The purpose of the instant invention is to provide a flexible shielded conduit having an unobstructed passageway therethrough. To accomplish this purpose the instant invention provides a flexible conduit tubing, flexible electrical shielding means disposed within the tubing and in contact therewith and axially compressed radially expanded elastic woven retaining means forcing the shielding means into continuous contact with the tubing.

In another form of the conduit in accordance with this invention, the flexible electrical shielding conduit comprises an outer layer of flexible conduit tubing having an internal cross-section and an axially compressed radially expanded composite inner layer disposed within the tubing having an unrestrained external cross-section of at least the tubing internal cross-section, the composite inner layer having the properties of an electrical shielding and also the property of continuously forcing the inner layer into contact with the tubing, thereby providing an unobstructed, shielded passageway throughout the conduit.

BRIEF DESCRIPTION OF THE DRAWING

FIG. 1 is a partial cross-sectional view of the flexible electrical shielding conduit in accordance with the present invention.

FIG. 2 is a full cross-sectional view of the shielded conduit shown in FIG. 1.

FIG. 3 is an enlarged full sectional view of the shielded conduit shown in FIG. 1 mounted on a mandrel.

FIG. 4 is a partial cross-sectional view of an alternative embodiment of the electrical shielding conduit in accordance with the present invention having an integral internal layer which is a combination shielding means and reinforcing means.

FIG. 5 is a full cross-sectional view of an alternate embodiment of the shielded conduit in accordance with this invention.

FIG. 6 is a full cross-sectional view of another embodiment of the shielded conduit in accordance with this invention.

DETAILED DESCRIPTION OF THE INVENTION

Referring now in more detail and by reference characters to the drawings, which illustrate practical embodiments of the present invention, there is shown in FIGS. 1 through 3, a flexible electrical shielding conduit generally indicated by the numeral 10. As illustrated, the shielding conduit includes a conduit tubing generally indicated by the numeral 12 having a cross-section of C (FIG. 3).

In accordance with the purposes and objects of the present invention the conduit tubing should be of flexible nature. Therefore, in the figures it can be seen that the conduit tubing has a corrugated shape in the form of alternating annular rings such as at 14. It is of course possible to use conduit tubing having convoluted shapes such as spirally wrapped convolutions or straight wall tubing having no convolutions but desirably being of a flexible nature to accomplish the purposes and objects of the invention.

Applicant has found tubing manufactured by Raychem Corporation under the trademark CONVOLEX* as being particularly adaptable to the purposes and objects herein. CONVOLEX* is particularly suited to to the instant invention because it is a lightweight, highly flexible conduit having high abrasion resistance. Further, the convoluted tubing, CONVOLEX*, is highly crush resistant and has a wide range of operating temperatures, e.g. −55° C. to 155° C. Further, CONVOLEX* can be bent, flexed, deformed and completely crushed and still return to its original shape.

*Raychem Federally Registered Trademark

The electrical shielding means shown at 16 comprises electrically conductive filaments woven together in a braided fashion as is common and conventional in the art. The shielding is disposed within the tubing 12 and in contact therewith as best seen in FIG. 3. The shielding has a particular thickness T. It will be appreciated that the thicker or the greater the value T, the less flexibility of the shielding for any given material. It will further be appreciated that the electrical shielding need not be braided or even woven as is described above but rather merely deformable so that it conforms to the shape of the tubing for contact therewith. Further, the shielding may be in one or multiple layers depending upon the user's shielding needs as shown in FIG. 5 and as designated by 16 and 16'.

The conduit 10 in accordance with the embodiment shown in FIGS. 1 through 3 includes a separate retaining means 18 for continuously and continually forcing the electrical shielding means 16 into contact with the tubing inner walls 13 disposed inside the shielding means 16. The retaining means 18 is composed of at least one filament such as at 19, and preferably includes a plurality of such filaments woven together as shown. In any case, the retaining means 18 expands radially upon being compressed axially and similarly contracts radially upon being expanded axially.

The retaining means is disposed inside the shielding means 16 in an axially compressed and radially expanded condition forcing the shielding means 16 against the tubing 12 and fixed in that condition. The retaining means may be fixed in the previously described radially expanded condition by operatively interconnecting the tubing and retaining means. For example, the retaining means may be operatively interconnected with the tubing by attachment of terminal connector ends to the ends of the tubing and retaining means, respectively. Alternatively, the tubing may be bonded to the retaining means either directly at the ends of the retaining means and tubing, respectively along the length thereof to maintain said axial expansion and radial expansion. In either alternative, the bonding means utilized may be cured by means such as heating or other suitable means, thereby operatively fixing the tubing to the retaining means. Alternatively, the retaining means may be operatively connected to the tubing by spot fusing indirectly through the shielding means or directly at the ends of the tubing and retaining means, respectively.

Applicant's preferred mode of fixing the retaining means in the axially compressed radially expanded condition inside the shielding is by presetting the retaining means at a normalized cross-section, compressing the retaining means and inserting it inside the shielding. In this mode the filaments 19 are preferably made of a polyester material, the retaining means may be placed on a mandrel, radially expanded, and heated, thus presetting the retaining means at a normalized cross-section. Once removed from the mandrel, the retaining means is thus preset and will return to its normalized cross-section. If a deforming force, such as bending, is imparted to the retaining means it will spring back in an elastic manner to its normalized preset cross-section.

It will be appreciated that the retaining means need not be in intimate contact with the shielding means. Similarly, it will be appreciated that the shielding means need not be in intimate contact with the tubing. The retaining means is used for keeping the conduit passageway unobstructed, thereby allowing electrical wiring or the like to be efficiently threaded therethrough.

The retaining means 18 may be made from filaments 19 which are combined such that the overall structure defining the retaining means forces the shielding 16 continuously against the inner wall 13 of the tubing 12 even upon deformation of the shielding conduit, e.g. bending or crushing of the conduit. EXPANDO TM material made by Bentley Harris has been found to be a particularly useful in this regard. EXPANDO TM is a lightweight polyester braid having a highly abrasion resistant surface. EXPANDO TM braid comes in variable external diameter ranges and is highly flexible. Further, the EXPANDO TM braid may be preset by heating as described above, to an expanded external cross-section. As will be appreciated, the continual radially outwardly urging of the EXPANDO TM braid provides the conduit with an obstruction free path even after severe deformation, thereby electrical wiring may be threaded through the conduit with maximum efficiency even though the conduit may have been crushed during shipment or while in storage.

The retaining means may be pulled over a mandrel 20 and expanded radially. Heat may then be applied to the retaining means 18 to heat set the retaining means to a normalized expanded external cross-section. The external cross-section of the retaining means should be at least equal to or greater than the internal cross-section (C) of the tubing 12 less twice the thickness (2T) of the electrical shielding means (C-2T). Preferably, the retaining means external cross-section should be greater than the internal cross-section (C) of the tubing 12 to insure that the retaining means continually and continuously exerts an outer radial pressure against the shielding, forcing it into continuous touching contact with the inner wall 13 of the tubing 12 as illustrated in the enlarged view shown in FIG. 3.

It will be appreciated that the cross-section of the conduit need not be circular as shown in the figures, for instance the conduit could be in the form of a flat coaxial cable.

After the retaining means 18 has been heated presetting the external cross-section, it is expanded axially, thereby reduced radially to accommodate the overlaying of the electrical shielding means 16 and tubing 12. Once the shielding means 16 and the tubing 12 have been slipped over the mandrel and retaining means, the conduit may then be cut to the size desired. Terminal ends, (not shown), such as terminal connectors or adaptors may be soldered, welded or otherwise attached to the ends of the conduit.

Thus, it will be seen that applicant has provided an electrically shielded conduit having a passageway which continuously remains unobstructed even when subjected to severe deforming forces such as bending, crushing or the like. Further, it will be seen that applicant has provided an electrically shielded conduit which remains obstruction free against severe deforming forces even when the shielding means is of a non-elastic nature since the retaining means continuously and continually forces the shielding radially outwardly against the tubing inner walls.

While it is preferable that the conduit tubing be insulated for mechanical and electrical protection, by using material such as Convolex*, it will be appreciated the purposes and objects of the invention may be accomplished without such insulation.

With particular reference to FIG. 4 there is shown an alternate embodiment of the electrical shielding conduit in accordance with this invention indicated generally at 10'. In the embodiment shown in FIG. 4, it can be seen that there is an integral inner layer 22 disposed within the conduit tubing 12. The inner layer performs both the function of an electrical shielding means and a retaining means for forcing the inner layer into contact with the inner tubing walls 13.

In one variation of this embodiment, the integral inner layer is a combination weave of electrically conductive filaments and retaining means filaments 19. In one example of the combination weave variation the first five filaments included in the inner layer are electrically conductive filaments, (similar to the filaments comprising the electrical shielding means 16), and every sixth filament of the weave is a filament similar to that of retaining means 18. In this example, the integral inner layer is identical to the shielding means 16 of the embodiment shown in FIGS. 1 through 3, except that every sixth filament is made from a material similar to that of filament 19 of the earlier embodiment. Of course, it will understood that every other filament or every 100th filament or the like, may be made from a material similar to that of filament 19 depending upon the shielding and retaining properties desired.

An additional variation of the embodiment shown generally at 10' is also possible. In the alternate variation, the integral inner layer may comprise a retaining means similar to the retaining means 18 which has been previously described and shown in FIGS. 1 through 3, sprayed with a metalized coating 25 as can be seen in FIG. 6. In this variation, the coating may be of any particular thickness depending upon desired shielding and retaining properties. The metalized coating provides the shielding properties while the retaining means 18 continues to function as previously described as long as the coating does not become too thick. Thus, in this variation of the integral layer embodiment, applicant provides an electrically shielded unobstruction free conduit using a metalized coated retaining means.

The alternative embodiment 10' having a single integral layer provides an electrical shielding conduit having an even lighter weight and greater flexibility than the embodiment shown in FIGS. 1 through 3 and generally indicated by the numeral 10. However, in the case of either the composite weave or the metalized coated embodiment, the amount of effective shielding possible using currently known materials will be substantially lessened. In the case of the composite weave where, for example, every six or so filament will be of a retaining means type material, the amount of shielding will be less because the shielding means cannot be as tightly woven as the shielding means shown in FIGS. 1 through 3. In the case where a metalized material is sprayed over the retaining means, the coating must be a sufficiently thin layer to enable the inner layer to retain its elasticity. If the lessen shielding effect is tolerable, the alternative embodiment is particularly desirable since it is of even lighter weight and greater flexibility than the embodiment shown in FIGS. 1 through 3.

While the instant invention has been described by reference to what is believed to be the most practical embodiments, it is understood that the invention may embody other specific forms not departing from the spirit of the central characteristics of the invention. In particular, substantial reference has been made to particular materials, namely CONVOLEX* and EXPANDO ™ as being preferred materials. It should be understood that there are other materials which possess the qualities and characteristics and would generally function in the same manner and should be considered within the scope of this invention. The present embodiments therefore should be considered in all respects as illustrative and not restrictive, the scope of the invention being limited solely by the appended claims rather than the foregoing description and all equivalents thereto being intended to be embraced therein.

What is claimed:

1. Flexible electrical shielding conduit comprising:
    flexible conduit tubing having an internal cross-section;
    a generally tubular flexible electrical shielding means having a predetermined thickness disposed within the conduit tubing; and
    axially compressible radially expansible retaining means for forcing the shielding means into contact with the tubing disposed inside the shielding means and in contact therewith, the external cross-section of retaining means being preset in axial compression at least as great as the internal cross-section of the conduit tubing less twice the thickness of the electrical shielding means.

2. Flexible electrical shielding conduit comprising:
    flexible conduit tubing having an internal cross-section,
    a generally tubular flexible electrical shielding means having a predetermined thickness disposed within the tubing; and
    axially compressible radially expansible retaining means for forcing the shielding means into contact with the tubing disposed within the shielding means and in contact therewith, the retaining means being operatively interconnected with the conduit tubing and maintaining the retaining means in axial compression at least as great as the internal cross-section of the conduit tubing less twice the thickness of the electrical shielding means.

3. The conduit as set forth in claim 1 or 2 wherein the retaining means comprises a plurality of woven filaments.

4. The conduit as in claim 1 or 2 wherein the retaining means and shielding means are integral.

5. The conduit as set forth in claim 4 wherein the integral electrical shielding means and retaining means comprises a composite weave including a plurality of electrically conductive filaments and at least one elastically deformable filament, the filaments woven into a braid which is axially compressible and radially expansible.

6. The conduit as set forth in claim 4 wherein the integral electrical shielding means and retaining means comprises an axially compressible and radially expansible elastic woven retaining means having an unrestrained external cross-section of at least the tubing internal cross-section and wherein the retaining means is coated with a layer of electrical shielding material.

7. The conduit as set forth in claim 1 or claim 2 wherein there are a plurality of layers of the integral electrical shielding means and retaining means.

8. The conduit as set forth in claim 1 or claim 2 wherein the shielding means comprises a plurality of shielding layers.

9. The conduit as set forth in claim 1 or claim 2 wherein the conduit tubing comprises elastically deformable conduit tubing.

10. The conduit as set forth in claim 1 or claim 2 wherein the conduit tubing has a convoluted shape.

11. The conduit as set forth in claim 10 wherein the tubing convoluted shape comprises alternating annular rings.

12. The conduit as set forth in claim 11 wherein conduit tubing is electrically insulating.

13. The conduit as set forth in claim 12 wherein the conduit tubing comprises CONVOLEX* tubing.

14. The conduit as set forth in claim 3 wherein the retaining means comprises EXPANDO TM braid.

15. The conduit as set forth in claim 1 wherein the retaining means is radially expanded on a mandrel and heated until the retaining means has a preset normal external cross-section at least equal to the internal cross-section of the conduit tubing.

16. The conduit as set forth in claim 1 wherein the preset external cross-section of the retaining means is greater than the internal cross-section of the conduit tubing.

* * * * *